US005341714A

United States Patent [19]

Roulet

[11] Patent Number: 5,341,714

[45] Date of Patent: Aug. 30, 1994

[54] SHOULDER SUPPORT FOR VIOLIN

[76] Inventor: Paul-Antoine Roulet, Les Jordils 1, CH-2016 Cortaillod, Switzerland

[21] Appl. No.: 49,427

[22] Filed: Apr. 21, 1993

[30] Foreign Application Priority Data

Apr. 21, 1992 [FR] France ................................ 92 04977

[51] Int. Cl.[5] ............................................ G01D 1/02

[52] U.S. Cl. ............................................ 84/278

[58] Field of Search .................. 84/278, 279, 280, 281

[56] References Cited

U.S. PATENT DOCUMENTS 4,212,222 7/1980 Henkle ................................ 84/278
4,248,125 2/1981 Everett ................................ 84/280
5,208,409 5/1993 Roulet ................................ 84/278

FOREIGN PATENT DOCUMENTS 0287520 10/1988 European Pat. Off. .............. 84/278
445632 9/1991 European Pat. Off. .
41057 4/1887 Fed. Rep. of Germany .
401172 8/1909 France .

*Primary Examiner*—Michael L. Gellner
*Assistant Examiner*—Patrick J. Stanzione
*Attorney, Agent, or Firm*—Sughrue, Mion, Zinn, Macpeak & Seas

[57] ABSTRACT

This support includes a stirrup (2) brought to be secured in the usual manner on the violin. The stirrup includes a plate in which is formed a channel (17) having a dovetail cross-section. An arm (5) forming part of a shoulder support exhibits a like cross-section at its fastening end (14). Furthermore such arm is split in order to accommodate a control element (18). The latter, through rotation thereof around the axis (X—X) of the slot (13), can spread apart the branches (5*a* and 5*b*) of the arm in order to clamp it in the channel (17). The control element (18) is assembled on the shoulder support (4) in a manner to prevent loss thereof. Application of the invention is to stringed instruments played at the shoulder.

17 Claims, 10 Drawing Sheets

SHOULDER SUPPORT FOR VIOLIN

The present invention relates to a shoulder support for violin and, more specifically, to such a support provided with a rapid mounting arrangement for the support by means of which the violin, during a performance, is supported against the shoulder of the violinist.

BACKGROUND OF THE INVENTION

A shoulder support of this type is described in French patent FR 2 659 163 filed in the name of the applicant. Basically, it includes a support piece intended to be in contact with the shoulder and secured to an arm, preferably in an adjustable manner. This latter itself is secured to the base of a chin rest through a connection which may be taken apart. The base of the chin rest is formed by a stirrup which bears the adjustable connection and the chin rest itself and which is clamped respectively against the back plate and the top plate of the violin.

The support thus enables holding the violin solely by squeezing such support between the chin and the shoulder of the performer, thus very comfortably for the latter, without requiring him to intervene with his left hand, which thus remains entirely free in order to pass from one position to another on the finger board of the violin.

Although in practice this known support generally gives satisfaction, it exhibits some drawbacks. Effectively, if the violin must be stowed in its case, necessitating the separation of the arm and the stirrup, a key must be employed of the six-sided type for example since the connection between the arm and the stirrup implies fastening by a screw and nut. This signifies that the user must always have available such a tool subject to loss or to be forgotten somewhere. Furthermore, the head of the screw or nut employed for fastening the arm to the stirrup constitutes a projecting portion at the base of the arm of the shoulder support. The presence of such projecting part causes extra thickness which may be bothersome.

Effectively, in traditional employment, that is to say, without use of a shoulder support, the space available for the instrument between the chin and the shoulder of the violinist is already very limited. Under these conditions, a shoulder support arrangement must, in order to give satisfaction, be of a design which occasions only a minimum space requirement under the back plate of the violin. The extra thickness described hereinabove can consequently constitute a redhibitory defect, at least for certain musicians.

The invention has as its purpose to overcome the two difficulties which have just been described in providing a shoulder support in which the securing of the arm to the stirrup may on the one hand be dismounted without tools and, on the other hand, does not occasion an extra thickness against the back plate of the violin.

SUMMARY OF THE INVENTION

It thus has as objective a shoulder support arrangement for violin of the type comprising:

- a clamping stirrup intended to be secured to the respective edges of the top plate and the back plate of the violin proximate the tailpiece end button,
- a chin rest secured on the stirrup on the top plate side thereof,
- and a shoulder support preferably coupled in an adjustable manner to a support arm, itself removably attached to said stirrup, the latter, to such effect, including a passage in which the end of the support arm proximate the stirrup is clamped by adjustable clamping means, characterized in that said end of the support arm is split longitudinally so as to form prongs of a fork, and in that said adjustable clamping means form a part of said support arm or of said stirrup and are arranged so as to enable the selective spreading apart of said prongs in order to clamp said end within said passage.

Thanks to the fact that the clamping means form a part of the stirrup, it is no longer necessary to employ a special tool to remove the shoulder support from the violin. Additionally, clamping is obtained by spreading apart of the prongs of the fork provided at the end of the arm of the shoulder support, the lateral faces of such prongs being then clamped against the lateral faces of the passage provided in the stirrup. Because of this, loosening of the prongs in order again to separate them from the lateral walls of the passage by operating the clamping means in the inverse sense does not require any special effort so that dismounting may be readily accomplished, even by a child, or without stressing in any manner the hand of the violinist.

The invention also has as objective a shoulder support of the type described hereinabove and in which the stirrup comprises two arms of adjustable length in order to assure clamping as well as a web coupling said two arms to one another and being brought to bear on the back plate, while on the side of said top plate said arms are inserted into holes formed in said chin rest and characterized in that said web and said arms of the stirrup are connected to one another through a connection piece extending facing the rib of the instrument and provided with assembly means allowing a predetermined lateral positioning of the arms of the stirrup relative to one another.

Thanks to these characteristics, the shoulder support arrangement can be easily used with various types of chin rests for which the distance between the securing holes is different.

Other characteristics and advantages of the invention will appear in the course of the description to follow given solely by way of example and prepared in referring to the accompanying drawings.

DESCRIPTION OF THE PREFERRED EMBODIMENTS

Figure 1:
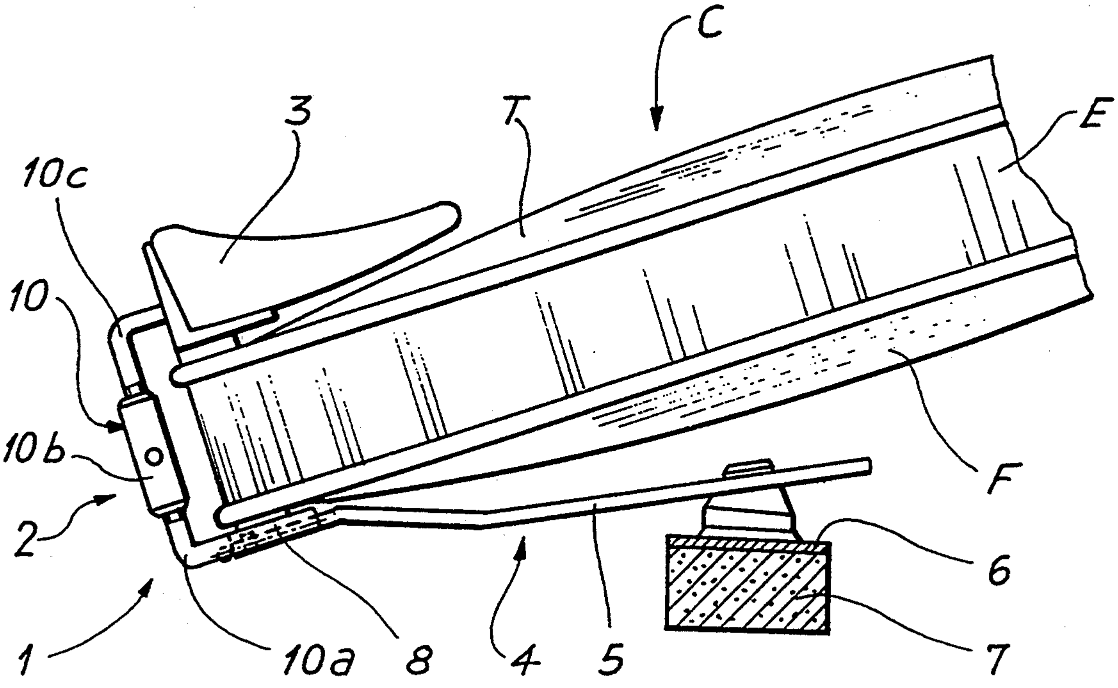
FIG. 1 is a side elevation view of the rear portion of a violin provided with a shoulder support conceived according to a preferred embodiment of the invention.
Figure 2:
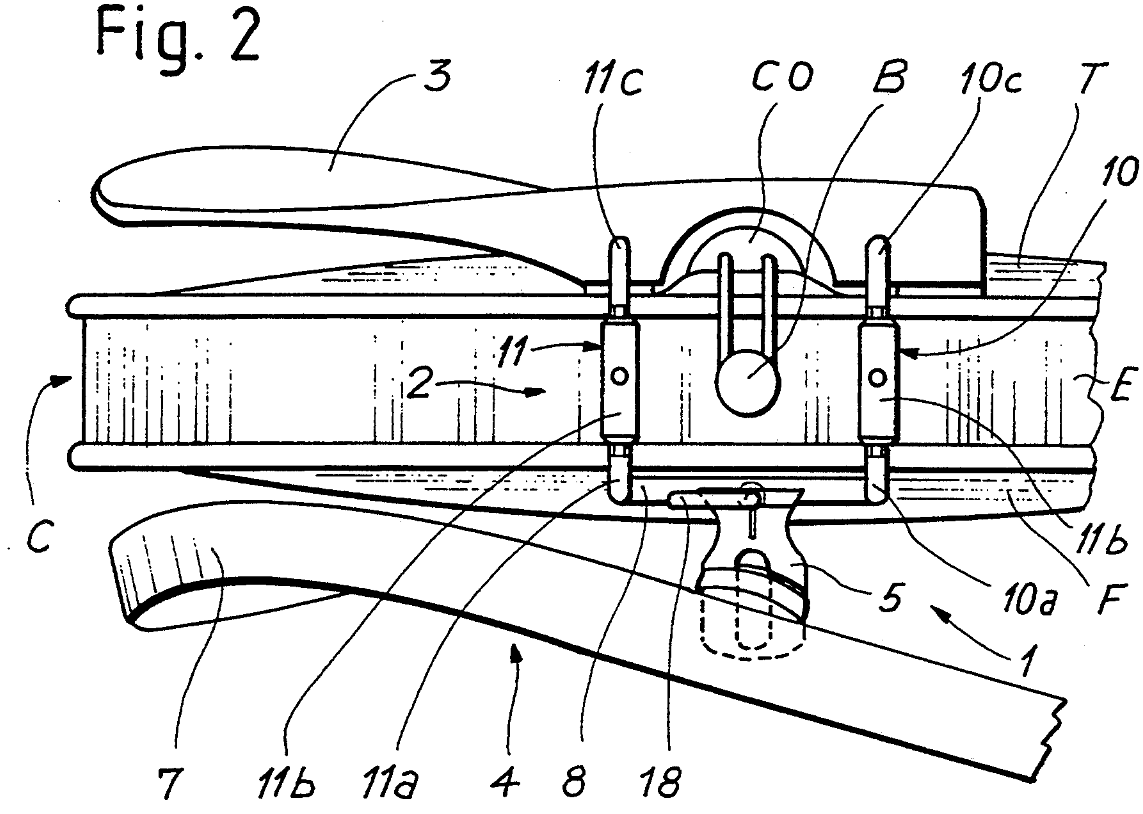
FIG. 2 is a partial rear elevation view of the violin of FIG. 1.

Initially, reference will be had to FIGS. 1 to 7B which show the preferred embodiment of the invention.

On these figures, the sounding box C of a violin has been shown with its belly T (top plate) and its back plate F joined by the rib E. A tail piece CO is attached in a standard manner to an end button B anchored in an end block (not visible on the drawing) placed within the sounding box C in order to support rib E at this place.

The shoulder support for violin according to the invention is designated by the general reference 1. It includes a stirrup 2, a chin rest 3 and a shoulder support 4 made up from an arm 5 and a cross-piece 6 provided with a cushion 7. For further detail concerning such shoulder support, reference may be had to the previously cited French patent 2 659 163. At the same time, it is to be noted that the invention is not limited to the specific utilization of the shoulder support such as described in this patent, being given that it bears more specifically on the manner of bringing about securing of the arm of a shoulder support to the stirrup, itself secured onto the violin.

Stirrup 2 includes a web 8 formed from a tablet 9, preferably metallic, and which may have a thickness of 2 mm, for example. The stirrup also includes two arms 10 and 11 which extend upwardly parallel to one another along rib E and are secured in the chin rest 2 in a standard manner. More specifically, each arm 10, 11 includes a first elbowed stem 10*a*, 11*a* fixed in the tablet 9 at one of its ends and screwed by its other end which is threaded into a socket 10*b*, 11*b* forming a tightening nut. A second elbowed stem 10*c*, 11*c*, also threaded at one of its ends, is screwed into the corresponding socket 10*b*, 11*b* and engaged at its other end in the chin rest 3. Thus, the stirrup fixed to the chin rest, may be clamped on the violin by tensioning arms 10, 11 through rotation of the sockets 10*b*, 11*b*. Preferably, a thin layer 12 of cork, for example, is placed between tablet 9 and the back plate F of the violin to avoid deterioration of the latter during the clamping operation.

According to the invention, arm 5 exhibits, at the end which cooperates with stirrup 2, a longitudinal slot 13 extending almost over a quarter of the length of such arm which, from this fact, exhibits the form of a fork having two prongs 5*a* and 5*b*. Furthermore, this same end of arm 5 exhibits a widened portion 14 the length of which is approximately equal to an eighth of the length of such arm. Thanks to this special form of such end of arm 5, prongs 5*a* and 5*b* may be spread apart or be brought slightly together without the arm undergoing a permanent deformation.

According to the invention, the shoulder support also includes clamping means designated by the general reference 15 and which enables locking arm 5 to stirrup 2. Such clamping means are designed in the following manner.

Figure 3:
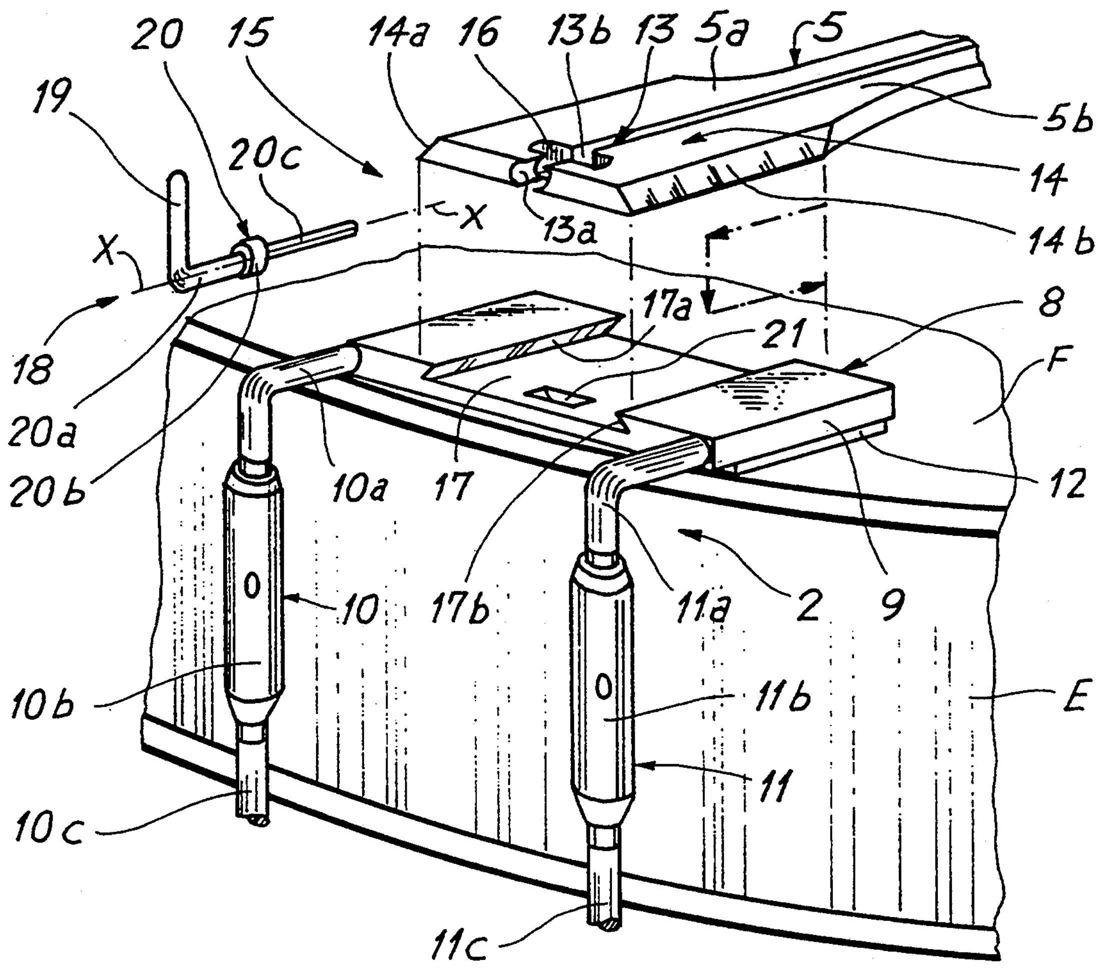
FIG. 3 is a partial exploded perspective view, taken at a larger scale than those of FIGS. 1 and 2, of the violin shown on these figures, the violin being represented with its back plate turned upwardly.
Figure 4:
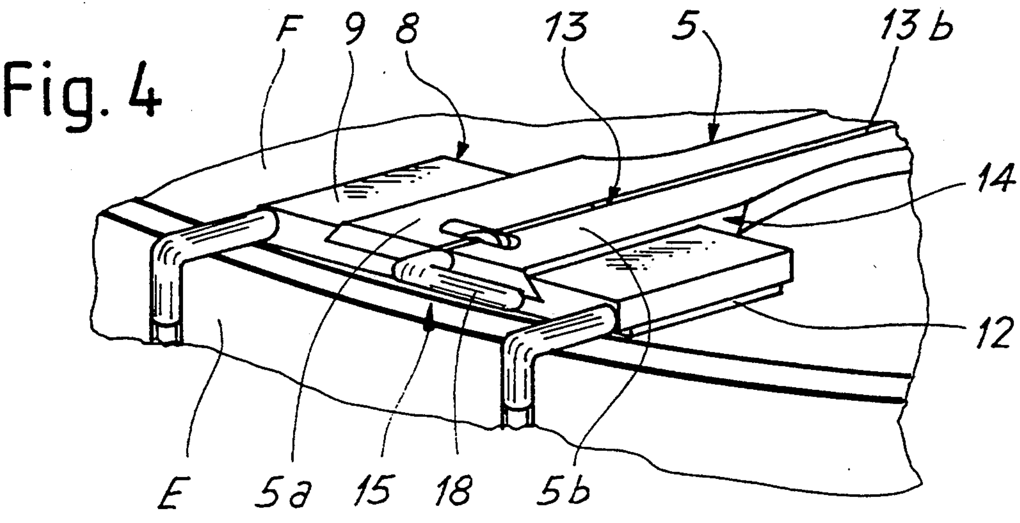
FIG. 4 is a view analogous to that of FIG. 3, but showing the assembled position of the shoulder support.

Slot 13 defines a passage including a first portion 13*a* the transversal cross-section of which is circular when arm 5 is in a free state (situation shown on FIG. 3). Such slot also exhibits a second portion 13*b*, the longitudinal side walls of which are straight and which thus exhibits a rectangular transversal cross-section. Portions 13*a* and 13*b* of slot 13 are separated from one another by an oblong aperture 16 which is additionally provided in the end of arm 5. It extends transversally to slot 13 over equal lengths on either side of the latter. The lateral edges 14*a* and 14*b* of widened end portion 14 of arm 5 are cut in a bevel in order that the latter assume the form of a dovetail.

As to tablet 9, this exhibits a passage 17 formed by a channel the lateral walls 17*a* and 17*b* of which are reentrant. In this manner, the transversal cross-section of passage 17 assumes the form of a dovetail complementary to the form of the transverse cross-section of the widened portion 14, it being understood that the dimensions of these two transversal cross-sections are selected in a manner such that there remains slight play between the widened portion 14 and the walls 17*a* and 17*b* of channel 17 when the end of arm 5 is inserted in this passage, while prongs 5*a* and 5*b* are still in the free state.

Figure 5:
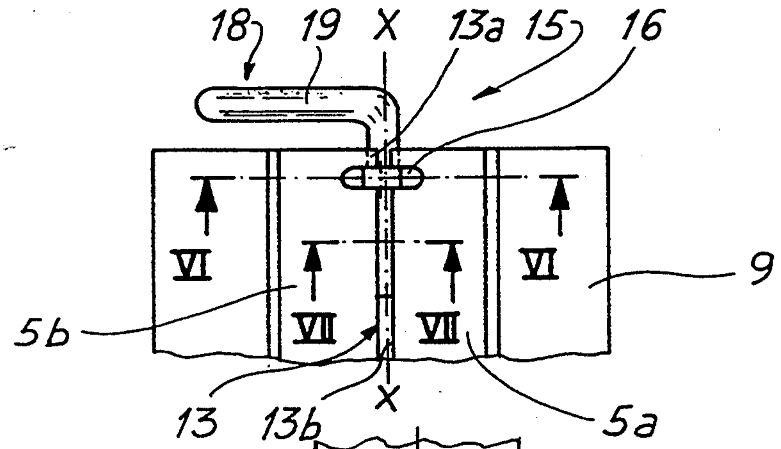
FIG. 5 is a partial plan view from below of the support mounted on the violin, the scale of such figure being approximately that of FIG. 1.

The clamping means 15 also include a control element 18 assuming the form of a key or wedge permanently mounted on arm 5 , while being able to be rotated around a rotation axis X—X which extends longitudinally relative to such arm ( see in particular FIG. 5 ) . Additionally, such axis coincides with the axis of the end portion 13*a* of slot 13 which, as already indicated hereinabove, has a circular cross-section when arm 5 is in the free state.

Key 18 has the general form of an L the small branch 19 of which acts as a hand lever and the large branch 20 of which is engaged in slot 13 of arm 5 (see in particular FIG. 3).

Such large branch exhibits three portions of different form (see also FIGS. 6A to 7B). A first portion 20*a* is of circular cross-section of a diameter slightly less than that of portion 13*a* of the circular section of slot 13.

A second portion 20*b* of branch 20 is an eccentric having a circular peripheral surface of a diameter clearly greater than that of portion 20*a*.

Figure 7A:
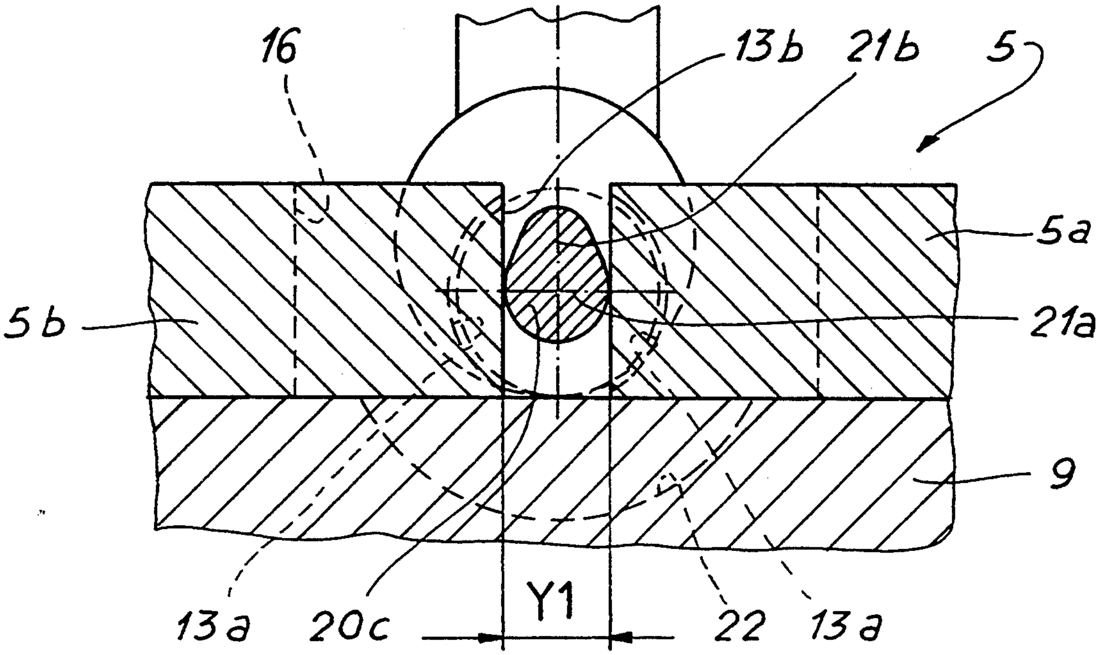
FIGS. 7A and 7B are views analogous respectively to FIGS. 6A and 6B, but taken along line VII—VII of FIG. 5.
Figure 7B:
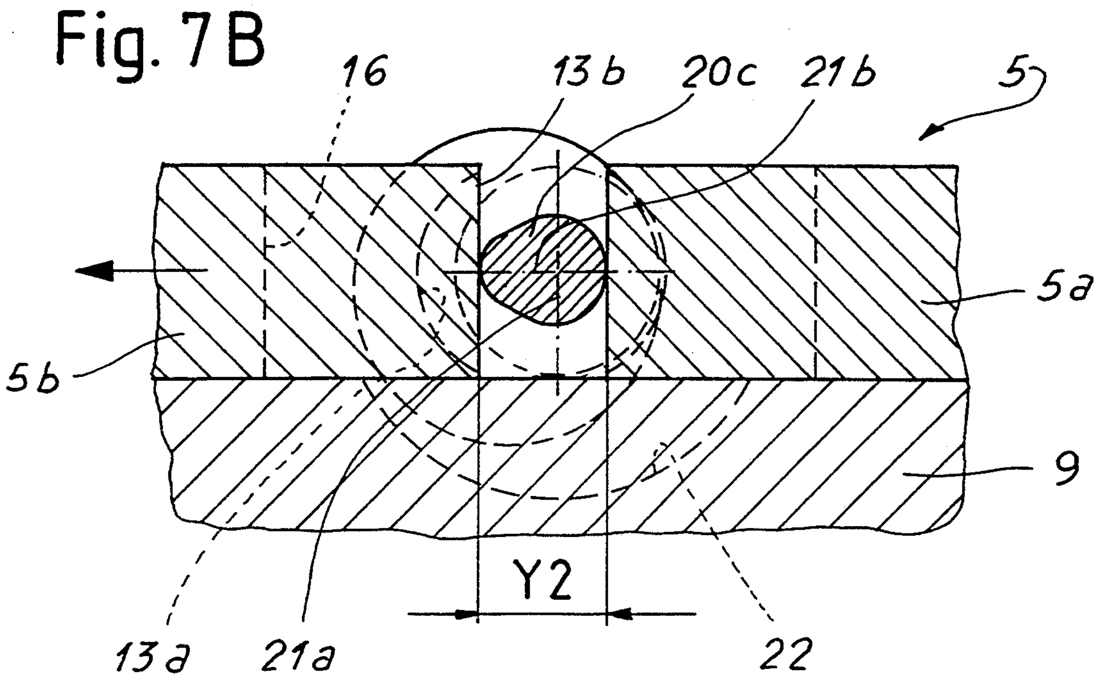

The third portion 20*c* of branch 20 exhibits a transversal cross-section of oval form with a minor axis 21*a* and a major axis 21*b* the length of which exceeds the width of the portion 13*b* of slot 13 when arm 5 is in the free state (see FIGS. 7A and 7B in particular).

Eccentric 20*b* cooperates with a small cavity 22 cut into tablet 9 close to the rear edge of the latter and located approximately in the middle of the bottom of channel 17 in such tablet. The eccentric is housed furthermore in the aperture 16 provided in arm 5 thanks to which key 18, once mounted in arm 5 through temporary deformation of its branches, is rendered longitudinally fixed. But it is also transversally fixed through the fact that its forward portion 20a of circular cross-section is held in the forward portion 13a of slot 13 whilst being guided therein in rotation. Thus, key 18 cannot be lost, even when the shoulder support 4 as such is dismounted from the violin.

In order to assemble this arrangement, it is convenient to introduce it as shown on FIG. 3, key 18 being in the position in which branch 19 is oriented perpendicularly to the plane of portion 14 of arm 5. Under these conditions, eccentric 20b is found in the position shown on FIG. 6A in which it is flush with the face of portion 14 which faces the bottom of channel 17. Consequently, such portion 14 may be slid into such channel without meeting any obstacle by a displacement along arrow 23 (FIG. 3). Such movement of arm 5 is guided in channel 17 from the fact that the ridges of edges 14b of portion 14 are held by the ridges of the re-entrant walls 17a and 17b of such channel. Furthermore, the rear portion 20c (FIG. 7A) is to be found oriented in a manner such that it exhibits the minor axis 21a of its cross-section perpendicularly to the straight lateral walls of the rear portion 13b of slot 13.

Figure 6A:
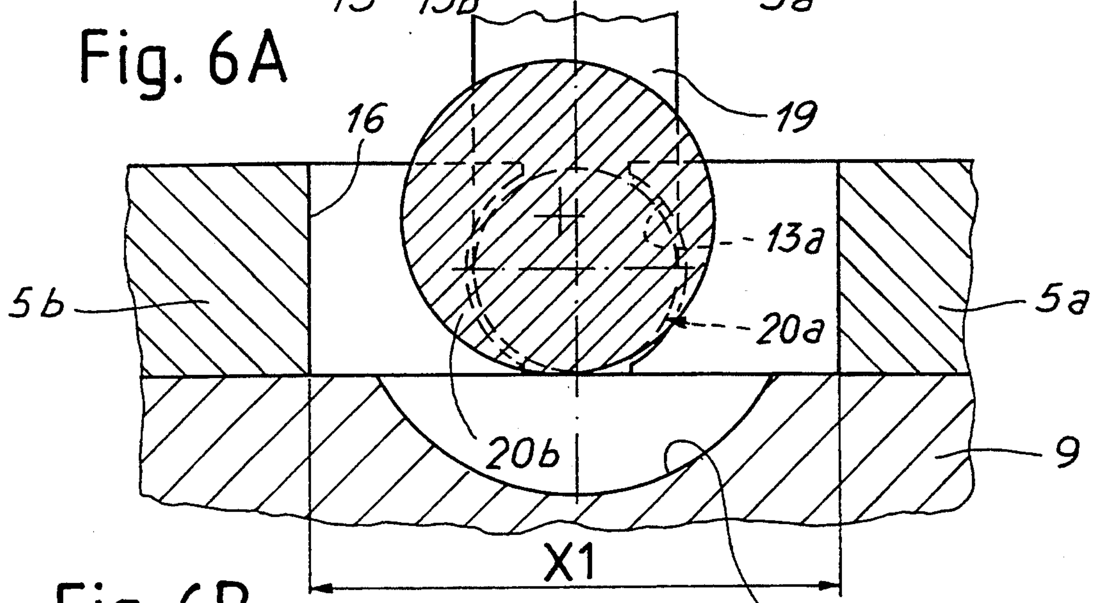
FIG. 6A is a cross-section to large scale taken along line VI—VI of FIG. 5, the support being shown in a position appearing just prior to clamping.

As indicated respectively on FIGS. 6A and 7A, the length of the oblong aperture 16 is then equal to X1, while the distance between the straight lateral walls of the rear portion 13b of slot 13 is equal to Y1.

Then, as soon as the end portion 14 of arm 5 is located at the proper place in the longitudinal direction of such arm, the latter may be blocked in place by a simple rotation over a quarter of a turn of the control element or key 18.

Figure 6B:
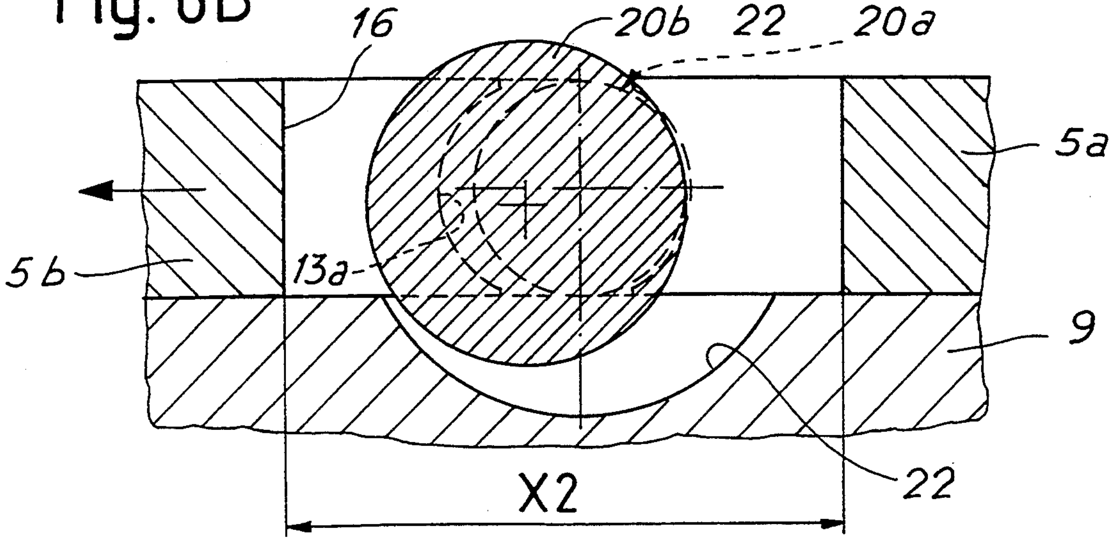
FIG. 6B is a cross-section analogous to that of FIG. 6A, the support here being shown in its clamped position.

This rotation movement has as effect that the rear portion 20c of key 18 henceforth presents its major axis 21b perpendicularly to the side walls of the rear portion 13b of slot 13 (FIG. 7B). Simultaneously, eccentric 20b of key 18 penetrates into cavity 22 of tablet 9 (FIG. 6B).

The rear portion 20c of key 18 then spreads apart prongs 5a and 5b of arm 5 which will then be clamped by edges 14a and 14b under the re-entrant side walls 17a and 17b of channel 17.

It thus results that the arm is blocked, an eventual untimely longitudinal movement of the arm relative to the tablet (for example because of a sudden movement of the performer) being prevented by eccentric 20b retained in cavity 22. As shown on FIGS. 6B and 7B, the length of the oblong aperture 16 and the distance between the side walls of the rear portion 13b of slot 13 are then respectively equal to X2 and Y2, respectively greater than X1 and Y1.

The mode of operation of such a mechanism naturally implies extremely low tolerances during manufacture of the parts which go to make it up. Effectively, in order that the arm be rigidly attached, it is necessary that prongs 5a and 5b of arm 5 be compressed between the side walls 17a and 17b of channel 17. The length Y2 of the major axis 21b of oval cross-section of the rear portion 20c of key 18 may thus not be less than a certain minimum value. Additionally, the length Y2 must furthermore not exceed such minimum value by more than some hundredths of a millimeter. Effectively, if the length Y2 of the major axis 21b is too great, prongs 5a and 5b of arm 5 will not have the space to be spread sufficiently and they will be damaged by crushing during the rotational movement of key 18.

To overcome the problem hereinabove, the embodiment of the shoulder support shown on FIG. 15 includes, arranged in one of the prongs of its arm (referenced 105 on this figure) a slot in the form of an L referenced 40 and intended to absorb the deformations of the metal forming arm 105. It is seen on FIG. 15 that slot 40 is formed of two rectilinear portions which come together in an elbow at 90° . The longer rectilinear portion extends parallel to the longitudinal axis of key 18 facing the portion of the latter the cross-section of which is of oval form, while the shorter portion forming the foot of the L extends from the elbow at 90° up to the longitudinal slot 13 which houses key 18.

The presence of slot 40 in one of the prongs of arm 105 enables the material forming the portion of the prong which is in direct contact with the oval cross-section region of key 18 to bend. Thanks to this elastic deformation possibility, arm 105 may cooperate without damage with a key 18 the axis Y2 of which can possibly exhibit a length exceeding the specifications by several tenths of millimeters.

Dismounting the shoulder support, for example in order to stow the violin in its case, is effected as easily as its assembly. It is sufficient to cause the key 18 to rotate through a quarter of a turn in order to bring up the hand-lever 19. Prongs 5a and 5b of arm 5 may then again come closer to one another because of the inherent elasticity of such arm which removes the clamping by the dovetail form of portion 14 of arm 5 and of channel 17 of tablet 9. The shoulder support may then simply be removed from stirrup 2.

Figure 8:
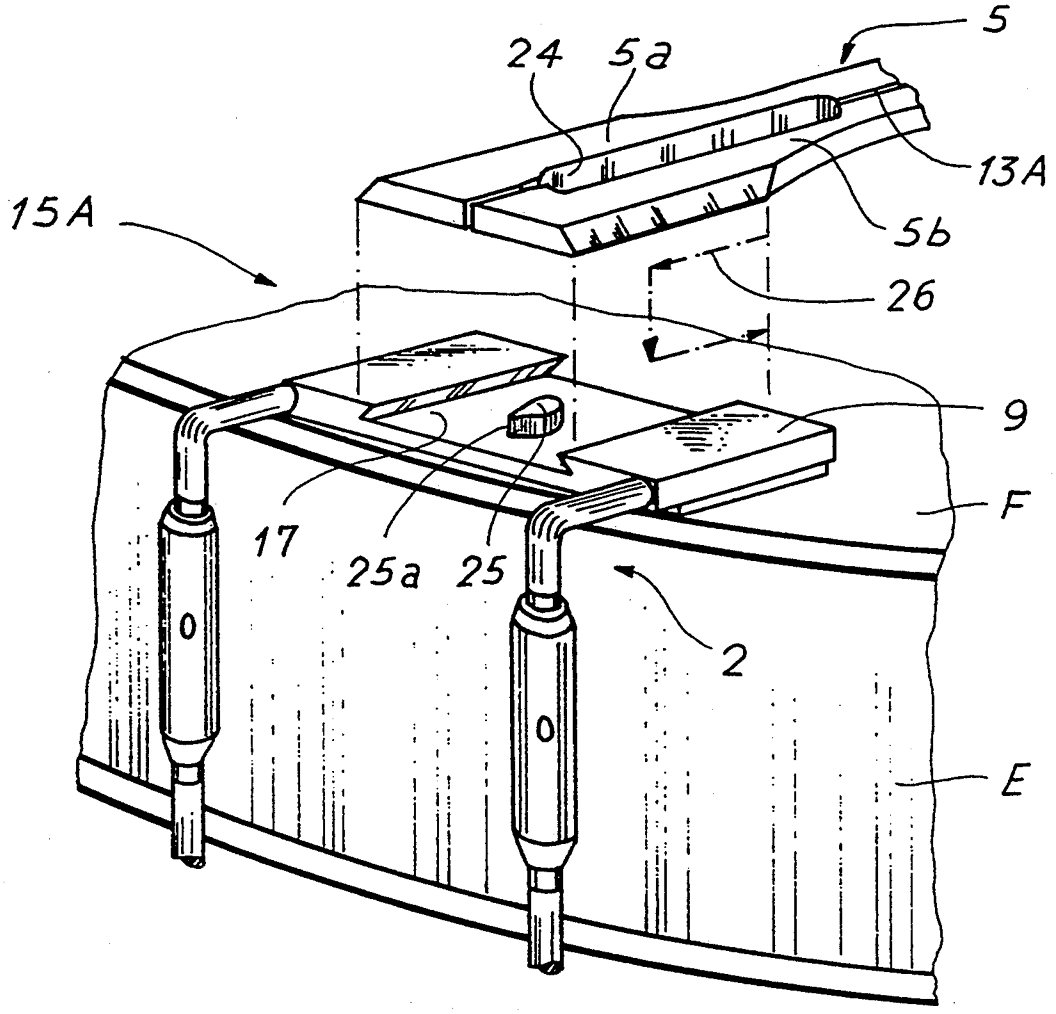
FIGS. 8 and 9 show by views respectively analogous to those of FIGS. 3 and 4 another embodiment of the invention.
Figure 9:
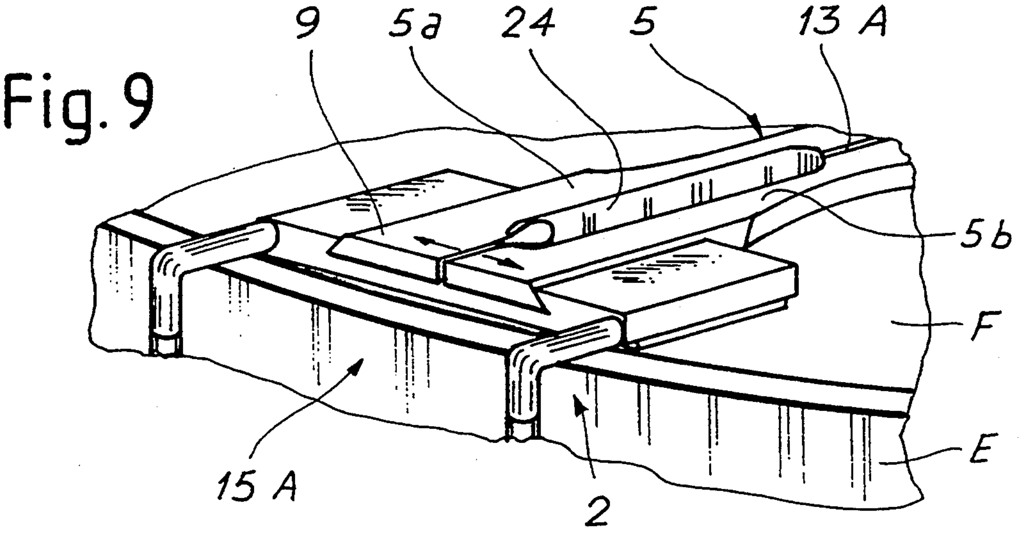

FIGS. 8 and 9 show a first variant of the clamping means, here designated by the general reference 15a. In this case arm 5 includes a slot 13a the side walls of which are parallel over the entire length. Nevertheless, close to the end of arm 5 the slot is interrupted by an elongated aperture 24 oriented axially relative to arm 5 and having a width clearly greater than that of slot 13a.

Furthermore, on the bottom of channel 17 and symmetrically relative to the side walls thereof is arranged a jamming element or wedge 25 exhibiting an edge 25a at the rear thereof.

When in such case the arm is slid into channel 17 of tablet 9, then drawn forwardly (movement indicated by arrows 26 on FIG. 8), the edge 25a of wedge 25 is introduced between the prongs 5a and 5b of arm 5 in spreading them apart from one another. There results therefrom clamping of the shoulder support 4 and immobilization of arm 5 in stirrup 2. Wedge 25 may be a piece separately machined and inserted by a dog (not shown) or glued, for example, in the bottom of channel 17 of tablet 9.

Figure 10:
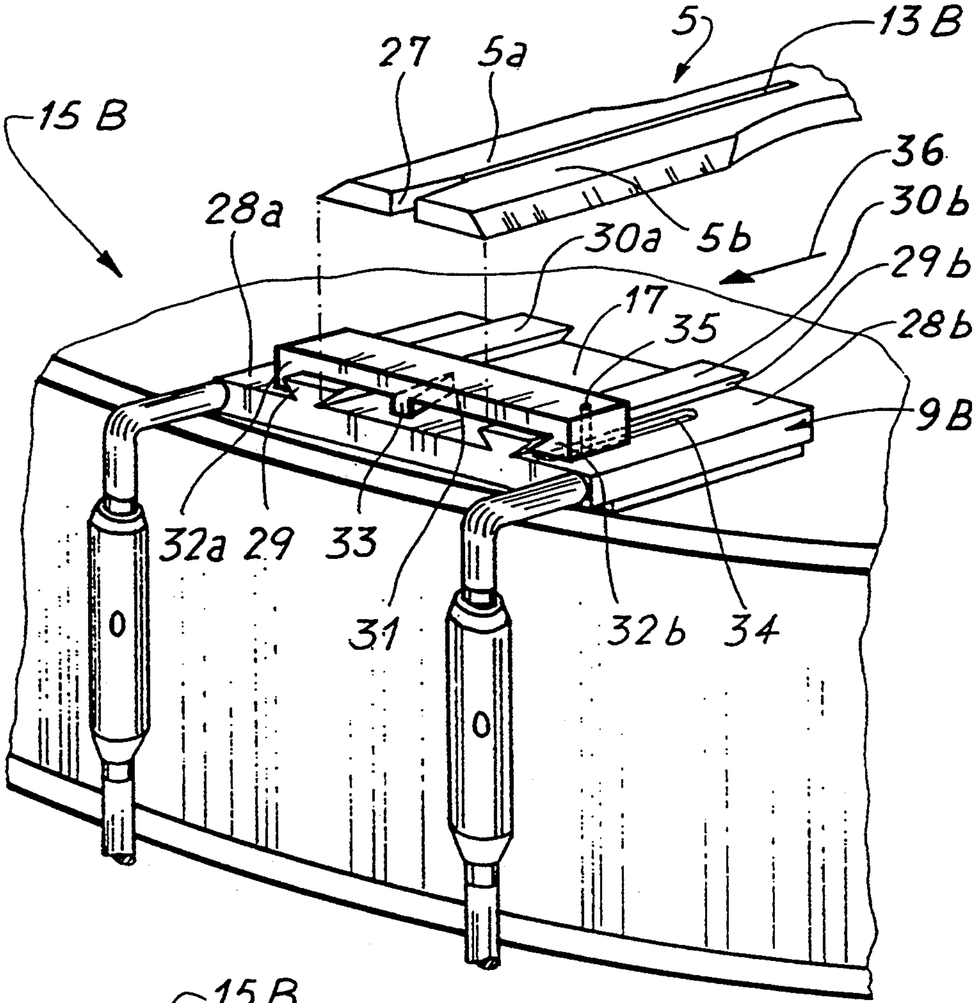
FIGS. 10 and 11 show by views analagous respectively to those of FIGS. 3 and 4 a third embodiment of the invention.
Figure 11:
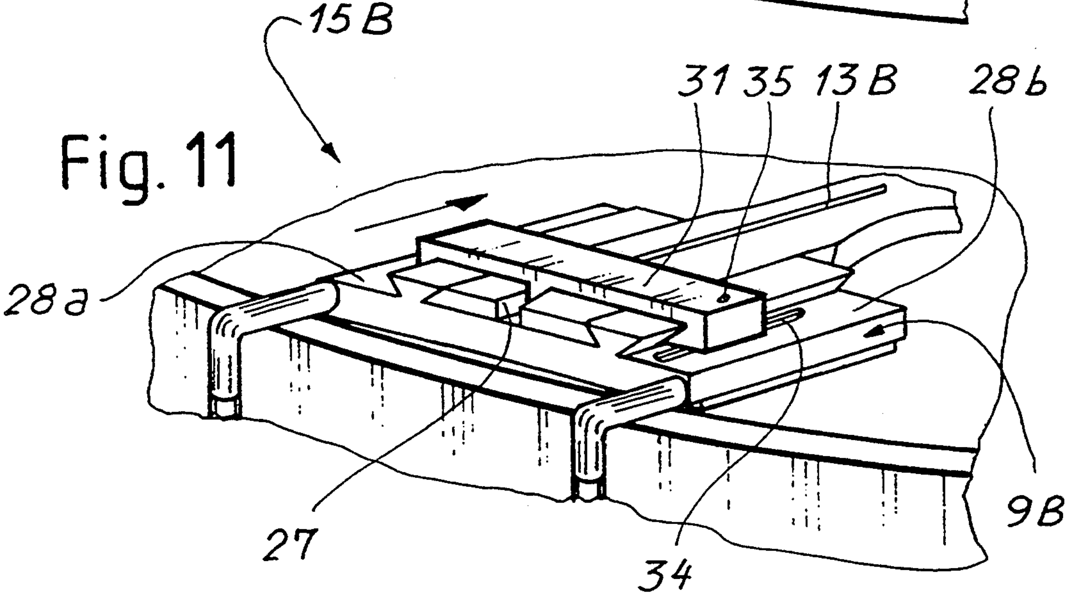

FIGS. 10 and 11 show another variant of the clamping means here indicated by the general reference 15b.

In this case arm 5 exhibits a longitudinal slot 13b which widens out towards the rear at 27. Here the stirrup includes a tablet 9b which, in addition to exhibiting channel 17 of the previous variants, includes lateral cutaways 28a and 28b interiorly bounded by re-entrant surfaces 29. Thus, such tablet 9b exhibits two parallel ribs 30a and 30b the sides of which exhibit re-entrant surfaces.

Surfaces 29 have as purpose to retain a jamming element or cursor 31 formed by a yoke which overrides the two ribs 30a and 30b and which laterally includes two hooks 32a and 32b engaging with the re-entrant surfaces 29. At the middle of cursor 31 is provided a wedge 33 facing the bottom of channel 17 of tablet 9b. Such wedge cooperates with the flared portion 27 of slot 13b of arm 5. Tablet 9b also exhibits an elongated milling 34 extending along rib 30b and with which cooperates a pin 35 inserted in cursor 31.

Assembly of arm 5 on tablet **9*b* is accomplished in this case in having it slide in channel 17 according to arrow 36. Blocking takes place then as soon as the cursor 31 is pushed in the reverse sense on ribs 30*a* and 30*b* in order to introduce wedge 33 between prongs 5*a* and 5*b* of arm 5 (see FIG. 11**).

It is thus determined that in all the embodiments of the invention described hereinabove, assembly and dismounting of the shoulder support does not necessitate any independent tool, the operation of blocking or unblocking being capable of being brought about easily and without effort by clamping means forming an integral portion of the assembly.

Reference will now be had to FIGS. 12 to 15 in order to describe a fourth and fifth embodiment of the invention.

On these figures will be seen the sounding box C of the violin with its belly T (top plate) and its back plate F, united by the rib E. A tail piece CO is attached in a standard manner to an end button B anchored in an end block (not visible on the drawing) placed on the interior of the sound box C in order to support the rib E at this place.

The shoulder support arrangement for violin according to the invention is designated by the general reference 101. It includes a stirrup 102, a chin rest 103 and a shoulder support 104 made up from an arm 105 and a crosspiece 106 provided with a cushion 107.

Figure 12:
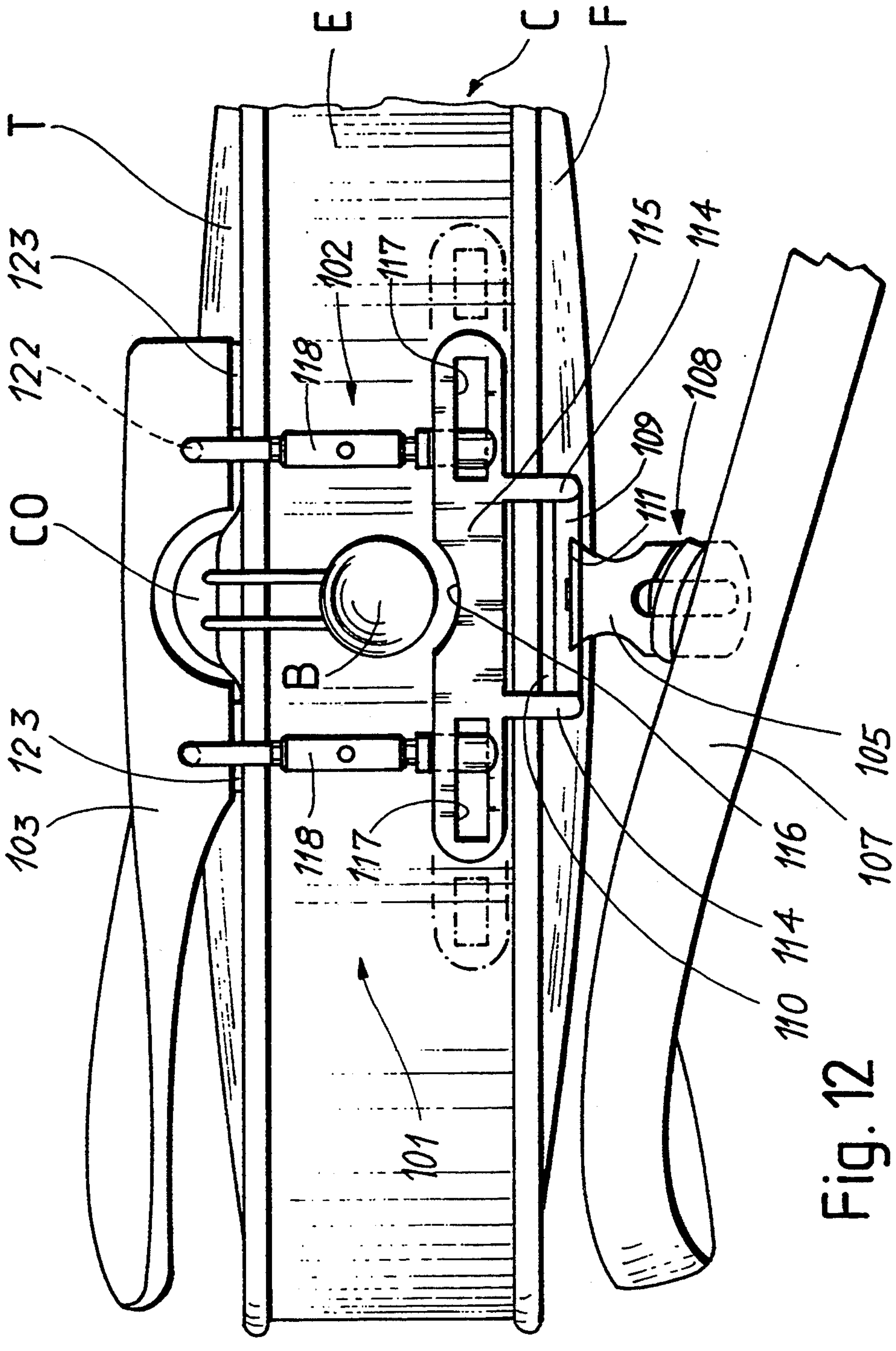
FIG. 12 is a partially cut-away elevation view of a shoulder support arrangement for violin or other analogous string instrument forming a fourth embodiment of the invention.
Figure 13:
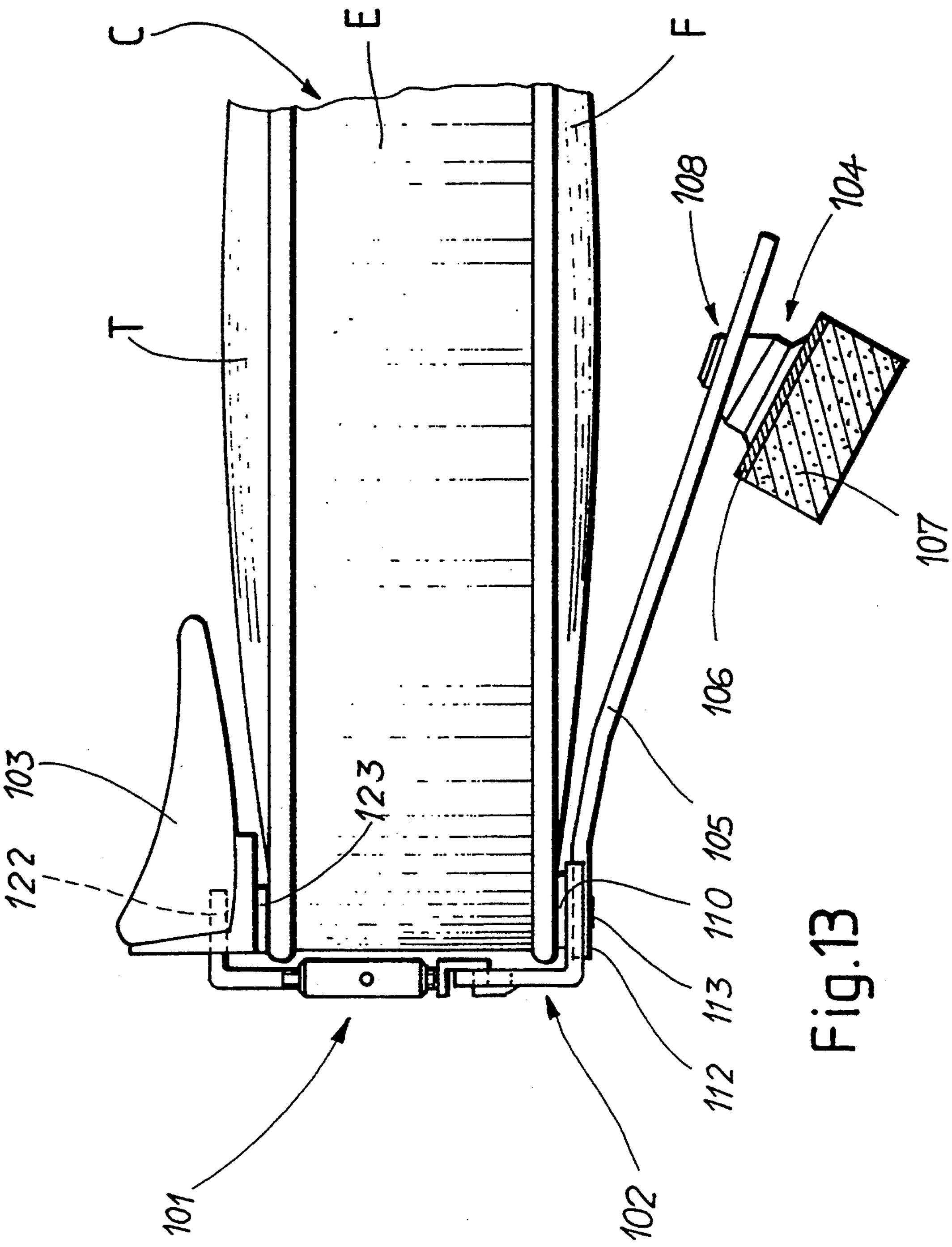
FIG. 13 is a lateral view of this same arrangement seen from the side, its shoulder support itself being shown in cross-section.
Figure 14:
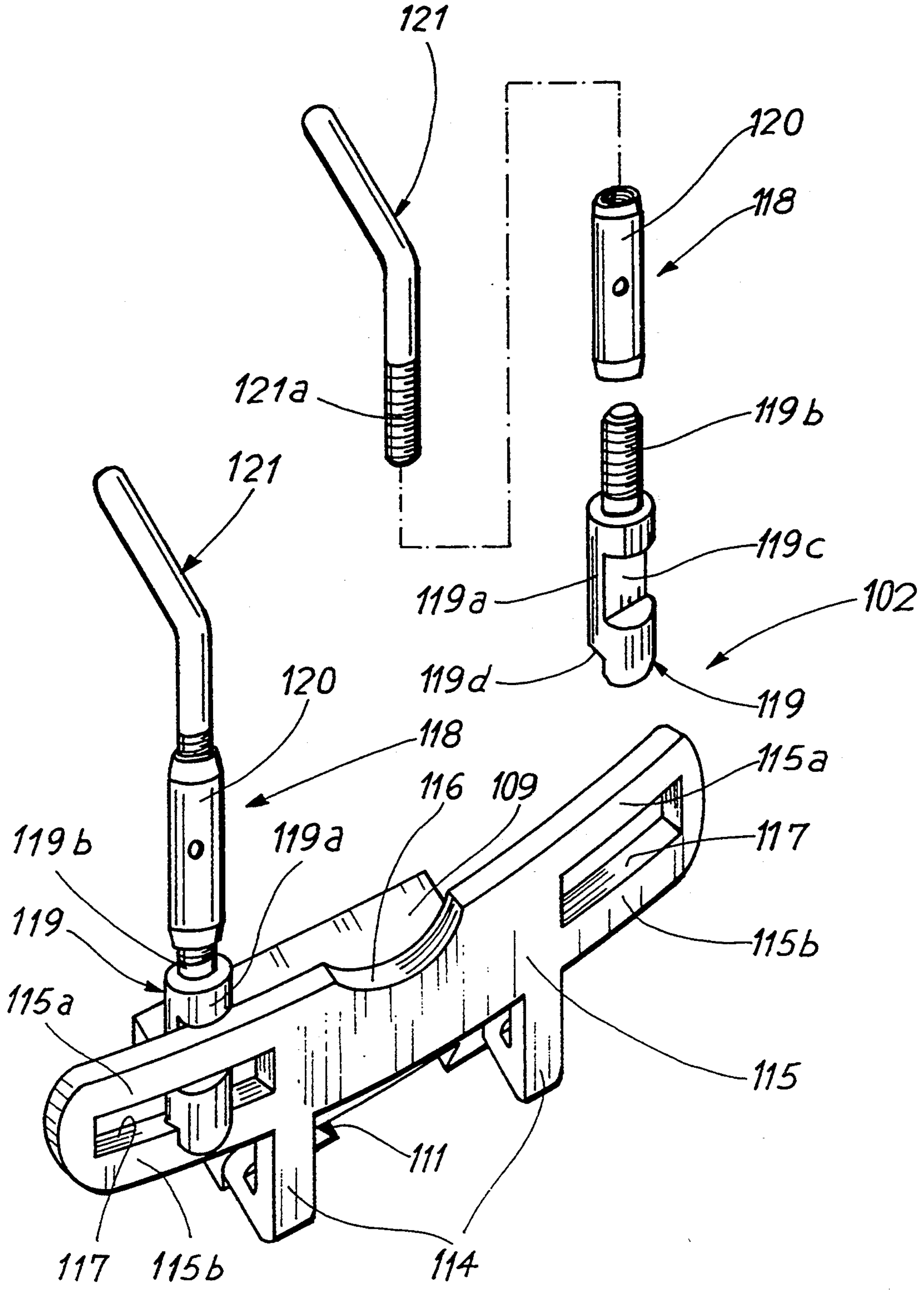
FIG. 14 is an exploded view of the stirrup employed in the support arrangement shown on FIGS. 12 and 13.

In the embodiment shown on FIGS. 12 to 14, the crosspiece 106 is folded back relative to arm 105 in inclination as well as in its longitudinal position along the latter, such position being easily attainable thanks to an adjustable fastening assembly 108. Such assembly and the manner of employing it are described in detail in patent FR 2 659 163 already cited.

According to the invention, stirrup 102 includes a web 109 in the form of a tablet applied against the back plate F of the violin with interposition of a thin sheet of cork 110, for example.

From the rear edge of tablet 109 of stirrup 102 extend towards the rear two connection lugs 114 which are both folded upwardly at right angles. They connect to a transversal bar 115 slightly arched in order to be adapted to the rounded form of rib E at this place. Such bar 115 also includes a cut-away in half-moon form 116 in order to avoid contact with the end button B.

The portions of the transversal bar 115 which project laterally from the respective connection lugs 114 are pierced with apertures 117 preferably in rectangular form and the long sides of which extend longitudinally relative to the transversal bar 115.

The tablet 109, connection lugs 114 as well as transversal bar 115 are preferably formed as a single metallic piece blanked and folded in an appropriate manner.

Stirrup 102 also includes two parallel arms 118 extending upwardly and each composed of three parts. Initially, a coupling piece assuming the form of a key 119 is intended to be adjusted in one of apertures 117 of the transversal bar 115. Each key is formed of a body **119*a* having a generally cylindrical form terminating at its upper end by a threaded tip 119*b***.

Such body **119*a* also exhibits two cut-aways, namely initially a flat 119*c* through means of which it may be brought into a straddling position on the upper portion 115*a* of transversal bar 115 which bounds the rectangular aperture 117. The flat 119 is found located in a position diametrally opposite and shifted in height on body 119*a* relative to a cut-out 119*d* also formed on such body at its lower end and which constitutes the second cut-away of the coupling piece or key 119. It is with the help of this cut-out that body 119*a* may be brought to bear against the lower portion 115*b* of transversal bar 115 bounding aperture 117**.

Since flat **119*c* and cut-out 119*d* are placed in diametrally opposite positions, they act against one another and thus assure a solid hooking of arm 118 on the transversal bar 115**.

Each arm 118 also includes a nut 120 in all respects similar to nuts usually employed in standard shoulder support arrangements. Each nut 120 is engaged on a stem 121 squarely folded and intended to be introduced in a hole 122 of the chin rest 103. The latter rests on the belly T of the violin through a thin sheet of cork 123.

Stem 121 comprises at its lower end a threaded portion **121*a* onto which is screwed nut 120**.

It is readily understood that stirrup 102 may be fixed to the violin by screwing down nuts 120 on the threaded end **119*b* of keys 119 on the one hand, and on the other hand the threaded portion 121*a* of stems 121. This being done, the rear portion of the violin is squeezed between the chin rest 103 and the tablet 109** which thus renders the violin fixed to the arrangement according to the invention.

It is also understood that the distance between the arms 118 of stirrup 102 may be adjusted to that separating the holes 122 of the chin rest by sliding keys 119 in apertures 117 of the transversal bar 115 prior to definitive tightening of nuts 120.

It results therefrom that the support arrangement according to the invention may be adapted not only to lack of precision of the distance separating holes 122 in chin rests, but also to chin rests having nominally different distances between such holes. The length of the apertures 117 formed in the transversal bar 115 can be chosen sufficiently great in order that a single support arrangement may be adapted to all chin rests which are found in practice.

As has been shown in broken outline on FIG. 12, the transversal bar 115 can have a length more or less great, as can be moreover the case of apertures 117. In certain cases it may even be advantageous to provide an asymmetry as to the length of apertures 117, above all when the chin rest is placed towards the left relative to the tail piece C.

Figure 15:
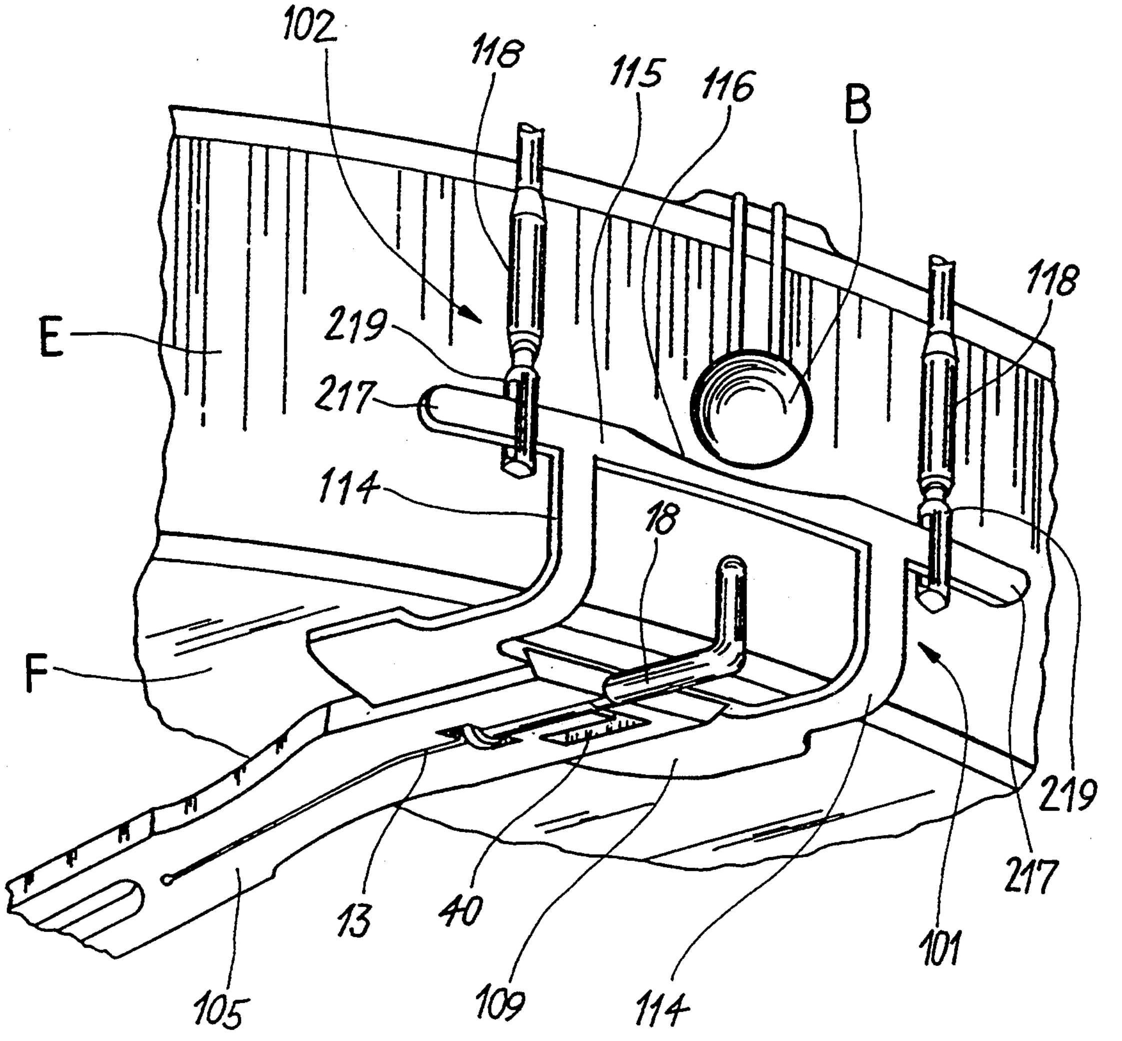
FIG. 15 is a perspective view of a shoulder support arrangement for violin or other analogous string instrument forming a fifth embodiment of the invention.

On FIG. 15 is seen a fifth embodiment of the present invention. The elements shown on FIG. 15 which have already been described in relation with FIGS. 12 to 14 are indicated by the same reference numerals.

In this special embodiment, the transversal bar 115 which serves as a connection piece between web 109 and the arms 118 of the stirrup includes two elongated ends referenced 217. From their side, the two parallel arms 118 of the stirrup each comprises a coupling piece 219 in the form of an earring or, more precisely, exhibiting an aperture in which may be engaged one of the extended ends 217 of the transversal bar 115.

It is thus understood that the distance between arms 118 of stirrup 102 may here also be adjusted to that separating the holes of the chin rest in sliding the coupling pieces 219 along the two ends 217 of the transversal bar 115 prior to definite tightening of nuts 120.

What I claim is:

1. A shoulder support arrangement for violin comprising:

a clamping stirrup intended to be secured to the respective edges of the top plate (T) and the back plate (F) of the violin proximate the tailpiece end button (B), a chin rest secured on the stirrup on the top plate side thereof, and a shoulder support preferably coupled in an adjustable manner to a support arm, itself removably attached to said stirrup, the latter, to such effect, including a passage in which the end of the support arm proximate the stirrup is clamped by adjustable clamping means, said end of the support arm being split longitudinally so as to form prongs of a fork, said adjustable clamping means forming a part of said support arm or of said stirrup and being arranged so as to enable the selective spreading apart of said prongs in order to clamp said end within said passage.

2. An arrangement as set forth in claim 1, wherein said passage exhibits re-entrant lateral walls, said end of the support arm including bevelled lateral surfaces complementary to the re-entrant surfaces of the passage, the whole thus forming a dovetail assembly.

3. An arrangement as set forth in claim 2, wherein said passage is a channel cut into a tablet forming the web of the stirrup, such channel being open towards the face of the tablet opposite the back plate of the violin.

4. An arrangement as set forth in claim 1, wherein said adjustable clamping means include a control element having at least one dimension which exceeds the width of the slot between the prongs, the portion of said control element exhibiting such dimension being adapted to be selectively placed within the slot by a movement relative to said arm.

5. An arrangement as set forth in claim 4, wherein said control element is an L-shaped piece, one of the branches of which forms a hand lever and the other branch of which is assembled for rotation on said arm by being inserted between the prongs of the latter, said other branch of the control element exhibiting a transversal cross-section having a predetermined dimension in one direction and another dimension greater than such predetermined dimension in a direction perpendicular thereto.

6. An arrangement as set forth in claim 4 or in claim 5, wherein said control element is assembled for rotation on said arm by a portion of circular cross-section accommodated in a portion of said slot the lateral walls of which define a circular cross-section whenever said arm is in the free state.

7. An arrangement as set forth in claim 6 wherein said control element includes an axial retention portion having a dimension exceeding the width of said slot separating the prongs of said arm, said retention portion being accommodated in an aperture formed in said arm and extending on either side of said slot.

8. An arrangement as set forth in claim 7, wherein said axial retention portion is an eccentric which projects from one of the faces of said arm when said control element is in its clamping position, said tablet of the stirrup including a cavity located in one of the walls of said passage and intended to receive the projecting portion of said eccentric.

9. An arrangement as set forth in claim 4, wherein said control element exhibits the form of a wedge.

10. An arrangement as set forth in claim 9, wherein said wedge is secured to one of the walls of said passage.

11. An arrangement as set forth in claim 9, wherein said wedge is provided on a cursor movably mounted for translation on said tablet and adapted to be brought for insertion between the prongs of said arm, thanks to such translation movement.

12. An arrangement as set forth in claim 1, said stirrup further comprising two arms of adjustable length in order to assure clamping, as well as a web coupling said two arms to one another and being brought to bear on the back plate, while on the side of said top plate said arms are inserted into holes formed in said chin rest, said web and said arms of the stirrup being connected to one another through a connection piece extending facing the rib (E) of the instrument and provided with assembly means allowing a predetermined lateral positioning of the arms of the stirrup relative to one another.

13. A support arrangement as set forth in claim 12, wherein said connection piece assumes the form of a transversal bar fixed to the web of the stirrup, said assembly means comprising coupling pieces respectively fixed to the arms of the stirrup and mounted in apertures formed in said transversal bar.

14. A support arrangement as set forth in claim 13, wherein said coupling pieces assume the form of keys in which cutaways are formed, arranged so that said keys hook onto the edges of the apertures provided in said transversal bar.

15. A support arrangement as set forth in claim 13 or in claim 14, wherein said apertures have a rectangular form and extend longitudinally relative to said transversal bar, said coupling pieces being slidingly engaged therein.

16. A support arrangement as set forth in claim 12, wherein said connection piece is formed together with the stirrup web as a single metallic piece.

17. An arrangement as set forth in claim 5 wherein said control element includes an axial retention portion having a dimension exceeding the width of said slot separating the prongs of said arm, said retention portion being accommodated in an aperture formed in said arm and extending on either side of said slot.

* * * * *